Aug. 25, 1964  L. V. HEBENSTREIT  3,145,573
CONTROL HEAD
Filed Dec. 21, 1962

INVENTOR
LESTER V. HEBENSTREIT
BY
*Ernest Jensen*
ATTORNEY

United States Patent Office 3,145,573
Patented Aug. 25, 1964

3,145,573
CONTROL HEAD
Lester V. Hebenstreit, Bloomfield, N.J., assignor to Specialties Development Corporation, Belleville, N.J., a corporation of New Jersey
Filed Dec. 21, 1962, Ser. No. 246,599
6 Claims. (Cl. 74—2)

The present invention relates to control heads for effecting actuation of a mechanism, and more particularly to an improved control head which responds upon immersion thereof in water to actuate a valve for controlling the inflation of a flotatable device such as a raft or the like.

The present invention is primarily concerned with the automatic inflation of rafts which are dropped from aircraft or are carried by a parachutist and are manned after inflation thereof has been effected. One of the difficulties heretofore encountered with automatic control heads is that they are set off prematurely due to shock or vibration or changes in atmospheric pressures at different altitudes or other causes. For example, the atmospheric pressure at 20,000 feet is about 6.76 p.s.i.a. and at near sea level approaches 14.7 p.s.i.a.

Accordingly, an object of the present invention is to provide an improved control head which is not subject to the foregoing difficulties but yet is positive and reliable in operation.

Another object is to provide such a control head which is unaffected by large changes in atmospheric pressure such as encountered in descending from high altitudes to near sea level but responds instantaneously to a small hydrostatic pressure upon immersion in water.

A further object is to provide such a control head which is simple, compact and economical in construction and is extremely light in weight.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein.

Figure 1:
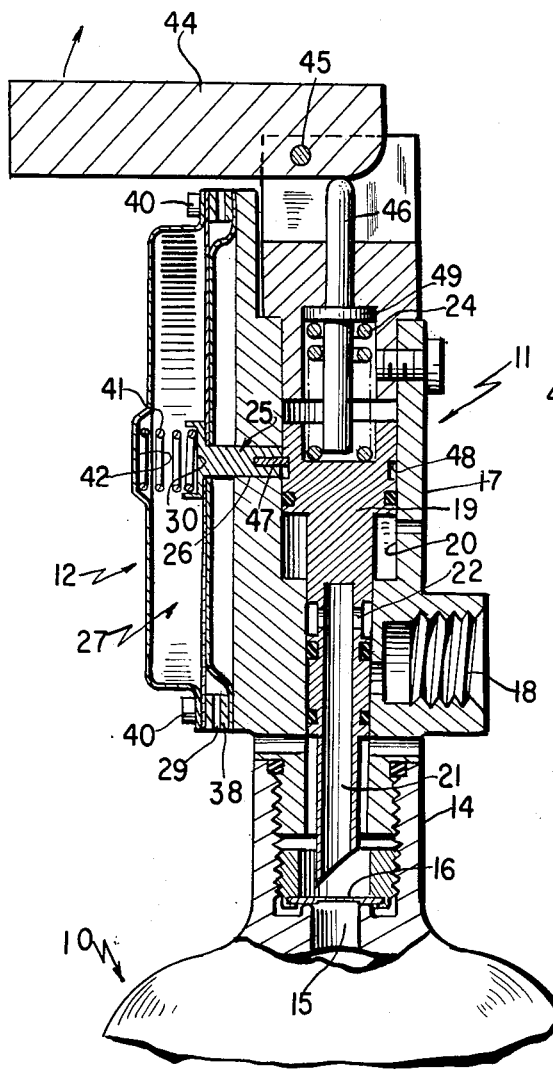
FIG. 1 is a longitudinal sectional view of a control head in accordance with the present invention applied to a mechanism for releasing gas under pressure to inflate a flotatable device.

Referring now to the drawing in detail, there is shown by way of example the essential elements of inflation gear which comprises a container 10 for storing gas under pressure, and a control head including valve mechanism 11 or the like for effecting release of the gas in the container and a control device 12 for automatically effecting actuation of the valve mechanism upon immersion of the control device.

The container 10 includes a spud 14 formed with an opening 15 through which the gas is to be discharged, and a disc 16 for sealing the opening 15.

The valve mechanism 11 generally comprises a body 17 having its inlet end secured to the spud 14 of the container and having an outlet 18 for connecting the device to be inflated (not shown), a member 19 slidably mounted for movement in a longitudinal bore or guideway 20 of the valve body, a hollow cutter 21 secured to the lower end of the member 19 for puncturing the disc 16 and formed with lateral openings 22 for establishing flow communication between the interior of the container 10 and the outlet 18, a spring 24 for driving the member 19 downwardly to operate the cutter, and locking means 25 extending through and movable in an opening 26 at one side of the bore 20 for restraining movement of the member 19 and maintaining the spring 24 under compression.

In accordance with the present invention, the control device 12 generally comprises a casing 27 on the valve body 17, and a diaphragm 28 mounted in the casing and connected to the locking means 25 to effect movement thereof and to render the same ineffective whereupon the valve mechanism will be actuated. The casing 27 has one or more apertures 29 at one side of the diaphragm for admitting gas such as atmospheric air and liquid such as water, respectively, depending upon whether the casing is in the air or is immersed in water.

The diaphragm 28 is constructed of a material which is pervious to air but is impervious to water so that air can pass freely through the diaphragm from either side whereby the diaphragm is unaffected by changes in air pressure and is unaffected by equal air pressure acting on both sides of the diaphragm and so that water entering the apertures 29 cannot pass through the diaphragm whereby a small hydrostatic pressure in back of the diaphragm will urge the diaphragm towards the left and move the locking means 25 out of restraining engagement with the cutter operating member 19. The diaphragm material may be a fabric such as canvas which may be treated with oil or grease to render it more impervious to water without impeding air flow therethrough.

Figure 2:
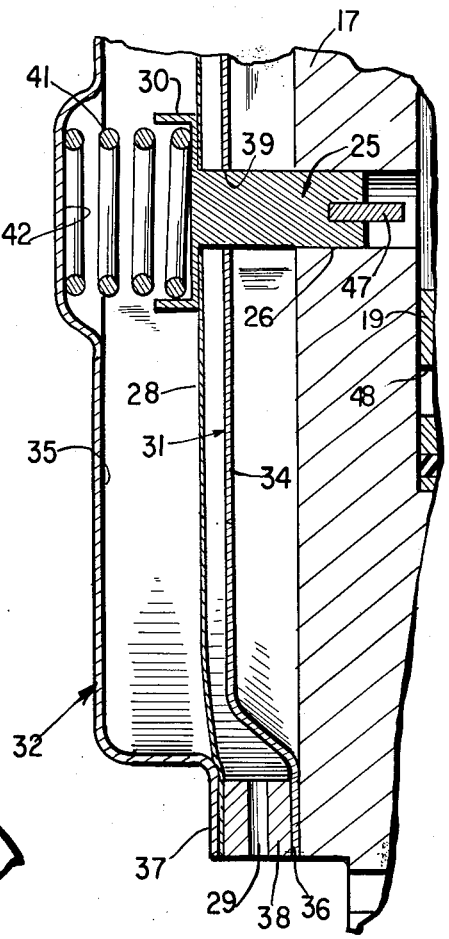
FIG. 2 is an enlarged fragmentary sectional view of the control head in its operated position.

In a practical embodiment of a control device 12 as shown herein (FIG. 2), the locking means is a pin or stud formed with a head 30 for securing the center portion of the diaphragm 28 thereto; and the casing 27 comprises inner and outer dished discs 31 and 32 formed with central wall 34 and 35, and peripheral flanges 36 and 37 respectively, a ring 38 formed with the apertures 29 disposed between the flanges 36 with the peripheral portions of the diaphragm 28 between the ring 38 and the outer flange 37 and with the central portion of the diaphragm overlying and abutting the central wall 34 of the inner disc 31 and with the locking means pin extending through a central aperture 39 in the inner disc 31, and screws 40 for securing the flanges, the ring and the diaphragm against a side wall of the valve body 17. Preferably, the diaphragm is held against the inner casing disc 31 and the locking means are held in locking position by a spring 41 positioned between the head 30 of the locking and a central well 42 in the outer casing disc 32 under sufficient compression to prevent the locking means from being rendered ineffective by shock or vibration.

The force of the spring 41 can be overcome to allow the locking means pin to move outwardly a sufficient distance to disengage the cutter operating member 19 when the casing is immersed in water and a hydrostatic pressure of about 0.5 p.s.i.g. acts on a diaphragm 28 having an area of about twelve square inches. As this occurs (FIG. 2), the air trapped between the diaphragm and the outer casing disc 32 is compressed slightly and resists movement of the diaphragm. Thus, in order to minimize such resistance to movement of the diaphragm, the diaphragm and disc 32 are spaced at least about one half inch so that the volume of the trapped air is reduced only a small amount percentage-wise as the diaphragm moves outwardly. By increasing space between the diaphragm and the disc 32 and increasing the area of the diaphragm, the diaphragm has a longer stroke and/or a stronger spring 41 can be used.

Manual operation of the valve mechanism 11 can be effected by a lever 44 pivotally mounted at 45 and engaging the outer end of a stem 46 having its inner end in engagement with the upper end of the cutter operating member 19 so that, upon clockwise rotation of the lever 44, the member 19 is forced downwardly to cause the locking means 25 to release the member 19, and the spring 24 now drives the cutter 21 through the disc 16. Disengagement of the locking means is facilitated by providing the inner end thereof with a disruptable element 47 such as a shear pin which fits into an annular groove 48 formed in the cutter operating member 19. The stem 46 is restrained against accidental inward movement by the spring 24 which has its upper end biased against a flange 49 on the stem.

From the foregoing description, it will be seen that the present invention provides an improved control head which is operated automatically upon immersion of a control device but can also be operated manually when desired. The control device is particularly useful on airborne inflatable equipment because it will not malfunction due to shock or vibration or changes in atmospheric pressure, but is also useful on other types of equipment adapted to be operated upon immersion. It will thus be appreciated that the control device could be utilized to effect release of any type of switch or valve operating member.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A control head comprising a movably mounted member, means for effecting movement of said member, locking means for engaging and restraining said member against movement, a casing, and a diaphragm mounted in said casing and connected to said locking means to effect movement thereof and to render the same ineffective, said diaphragm being constructed of material pervious to gas and impervious to liquid and said casing having aperture means at one side of said diaphragm for admitting gas and liquid, whereby said diaphragm is unaffected by changes in gas pressure but said diaphragm responds to the pressure of liquid entering said aperture means upon immersion of said casing in a body of liquid to thereby render said locking means ineffective.

2. A control head according to claim 1, including a spring for urging said locking means into engagement with said member.

3. A control head according to claim 1, wherein said locking means includes a disruptable element in engagement with said member, and said means for effecting movement of said member includes a manually operable device for moving said member to disrupt said element and render said locking means ineffective.

4. A control head according to claim 1, wherein said casing, includes an inner and an outer dished disc formed with a central wall and a peripheral flange, and a ring formed with said aperture means between said flanges, said diaphragm having its peripheral portions disposed between said ring and said flange of said outer disc and having its central portion overlying said central wall of said inner disc.

5. A control head comprising a body formed with a guideway and an opening at one side of said guideway, a movable member slidably mounted in said guideway, means for effecting movement of said member including a spring, locking means movable in and extending through said opening and engaging said member to restrain movement thereof, a casing on said body, a diaphragm mounted in said casing and connected to said locking means to effect movement thereof and to render the same ineffective, and a spring in said casing for urging said locking means into engagement with said member, said diaphragm being constructed of material pervious to air and impervious to water and said casing having aperture means at one side of said diaphragm for admitting air and water, whereby said diaphragm is unaffected by changes in atmospheric pressure but said diaphragm responds to the pressure of water entering said aperture means upon immersion of said casing in a body of water to thereby render said locking means inffective.

6. A control head according to claim 5, wherein said casing, includes an inner and an outer dished disc formed with a central wall and a peripheral flange, and a ring formed with said aperture means between said flanges, said diaphragm having its peripheral portions disposed between said ring and said flange of said outer disc and having its central portion overlying said central wall of said inner disc, said flanges and said ring being secured to said body at the side formed with said opening.

No references cited.